United States Patent [19]

Eissinger et al.

[11] 3,828,885

[45] Aug. 13, 1974

[54] HOOD AUXILIARY HOLD-DOWN DEVICE

[75] Inventors: Ramon C. Eissinger; Ronald W. Provancher, both of Dearborn, Mich.

[73] Assignee: Ford Motor Company, Dearborn, Mich.

[22] Filed: Apr. 18, 1973

[21] Appl. No.: 352,396

[52] U.S. Cl.................. 180/69 C, 292/DIG. 65
[51] Int. Cl............................................. B62d 25/10
[58] Field of Search.................. 180/69 C, 69 R; 292/DIG. 65, 300, 216, DIG. 22

[56] References Cited
UNITED STATES PATENTS

| 3,599,743 | 8/1971 | Hull | 292/216 X |
| 3,709,316 | 1/1973 | Glance | 180/69 C |
| 3,754,614 | 8/1973 | Habas | 180/69 C |

Primary Examiner—Kenneth H. Betts
Assistant Examiner—David M. Mitchell
Attorney, Agent, or Firm—K. L. Zerschling; J. J. Roethel

[57] ABSTRACT

A vehicle compartment having an elongated closure or hood structure hinged at one end of the compartment for swinging movement between closed and opened positions. The compartment closure in closed position has side edge means in contiguous relationship to side edge means of the compartment side walls. A plurality of large headed studs per side are mounted on one of the side edge means in cooperative relationship to keyhole slotted reinforcing members on the contiguous side edge means. Upon longitudinal displacement of the closure as a result of an endwise vehicle impact or collision, the headed studs interlock with the keyhole slotted members. This provides a strong holddown force effective to minimize the extent of possible longitudinal displacement of the closure.

4 Claims, 3 Drawing Figures

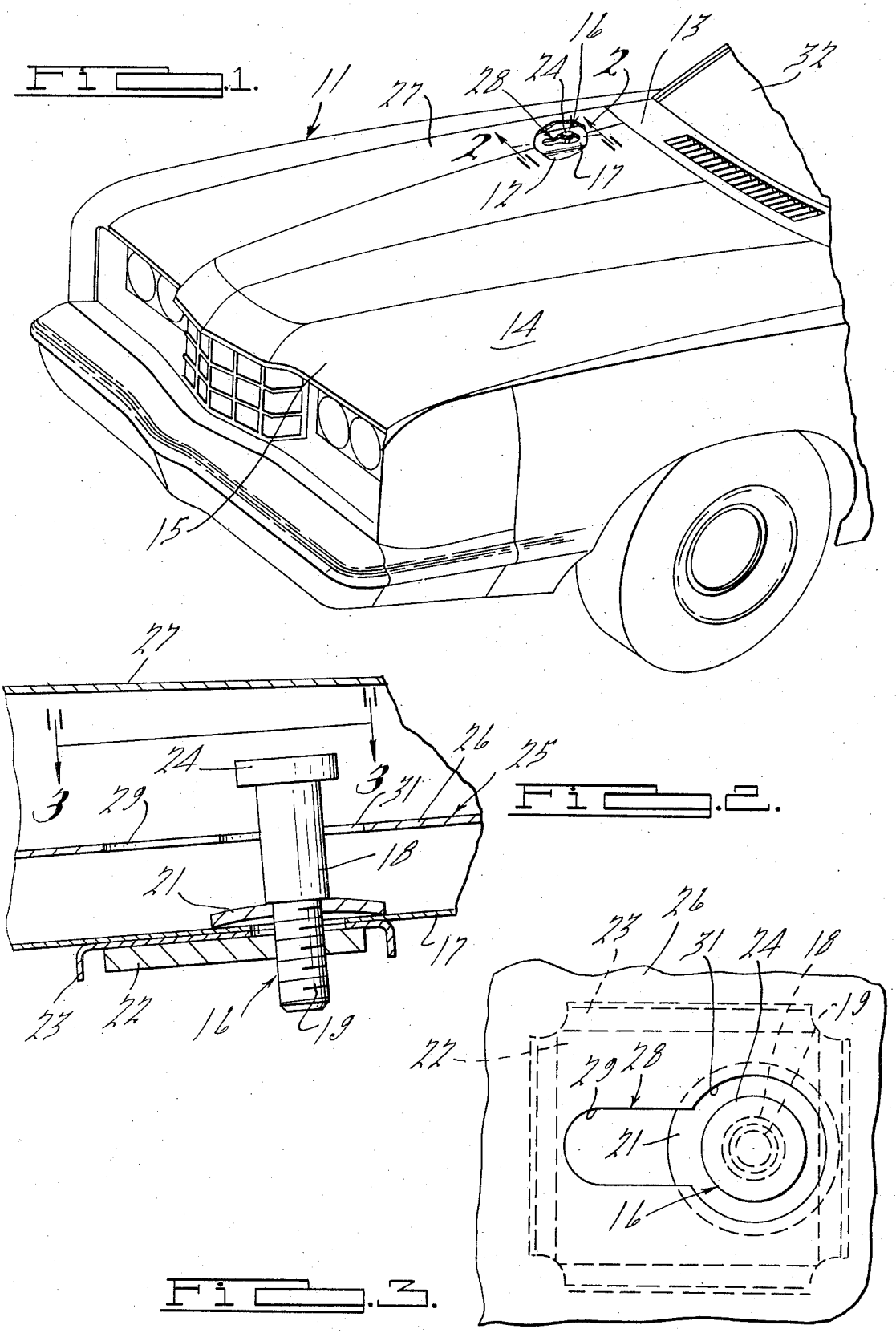

3,828,885

HOOD AUXILIARY HOLD-DOWN DEVICE

BACKGROUND OF THE INVENTION

As was noted in U.S. Pat. No. 3,709,316 issued to P. M. Glance on Jan. 9, 1973 entitled "Cam Action Safety Hood," front-hinged closures or hoods for vehicle compartments such as the engine compartment have at least one objection to their usage. The front-hinged hood or closure is a potential battering ram able to cause damage or injury to the vehicle windshield and the vehicle occupants behind the windshield. The reason for this is that as the front end of the vehicle collapses upon endwise impact, the closure or hood is driven longitudinally rearwardly. Frequently, the latches that hold the rear end of the closure or hood in latched engagement with the vehicle cowl structure fail as the closure or hood supports yield. The resulting movement of the rear end of the closure or hood is up and over the cowl structure into the windshield causing the latter to fracture. If the impact is severe enough, the closure or hood may penetrate through the windshield opening into the vehicle passenger compartment, compounding the crash injuries sustained by the vehicle occupants.

The aforementioned patent to P. M. Glance discloses a system for causing the closure or hood to buckle under impact thus absorbing impact energy and relieving the strain on the rear mounted latches.

U.S. Pat. No. 3,599,743 issued Aug. 17, 1971 to N. A. Hull for a "Closure Holddown Arrangement" discloses an auxiliary hold-down arrangement for positively maintaining a closure or hood member in lowered position under impact or collision conditions. The arrangement utilizes a pivoted latch member held out of engagement with a striker by a frangible connection adapted to shear under an impact load a predetermined magnitude.

It is an object of the present invention to provide an auxiliary hood hold-down that will protect the integrity of the windshield in a much simpler and more reliable manner than the arrangements disclosed in either of the reference patents.

SUMMARY OF THE INVENTION

The present invention relates to a vehicle compartment having side walls extending longitudinally of the vehicle and an elongated closure or hood panel hinged at one end of the compartment for swinging movement between closed and opened positions. The closure in closed position has a side edge means in contiguous relationship to side edge means of the compartment side walls. A plurality of stud means each having a shank capped by an enlarged head portion are anchored on one of the edge means with each stud having its capped end projecting toward the contiguous edge means. The slot means provided in the contiguous edge means each has an elongated section extending longitudinally of the vehicle and terminating at one end in an enlarged aperture. The width of each slot means section is sufficient to accommodate a stud means shank and the aperture at the end of the slot is of a size permitting a stud means head portion to pass freely therethrough as the closure is swung to and from a closed position.

The shank of each stud means is positioned to enter a slot means and the head portion thereon to be displaced relative to the enlarged aperture into slot means margin engagement thereby minimizing upward and longitudinal displacement of the closure structure upon the latter being shifted longitudinally as the result of an endwise impact upon the closure structure at its hinged end.

DESCRIPTION OF THE DRAWINGS

Other objects, advantages and features of the present invention can be made more apparent as this description proceeds, reference being had to the accompanying drawings, wherein:

FIG. 1 is a fragmentary perspective view of the front end of a motor vehicle equipped with the hood panel or closure structure embodying the present invention;

FIG. 2 is a vehicle section on the line 2—2 of FIG. 1;

FIG. 3 is a view in the direction of the arrow 3—3 in FIG. 2.

DETAILED DESCRIPTION OF THE INVENTION

Referring now to the drawing, there is illustrated in FIG. 1 a front end structure of a vehicle body, generally designated 11. The front end structure 11 comprises an engine compartment having a front wall (not visible), side fender aprons 12 (only one of which is partially visible), a rear cowl structure 13 and a longitudinally extending closure or hood structure 14.

The closure or hood structure 14 is hinged at its front end 15 to the engine compartment front wall by conventional hinge devices (not shown). The conventional latch device or latch devices (not shown) releasably latch the closure or hood structure 14 to suitable keeper devices (not shown) mounted on the cowl structure 13.

The foregoing briefly summarizes conventional structure related to any front-hinged closure or hood structure for an engine compartment.

Through barrier crash tests in which vehicles are driven head-on into an immovable barrier, it has been determined that the front-hinged closure or hood structures have one serious disadvantage. As the front end of the vehicle collapses, the closure or hood structure 14 is shoved rearwardly and begins to buckle forward of the latch devices latching the closure or hood structure to the cowl structure. As the buckling progresses, the latch devices are placed under high stress conditions and frequently fail so that the latch end of the closure or hood structure breaks away from the cowl structure. The hood structure then has a tendency to pass up and over the cowl structure into the windshield causing the latter to be fractured. If the frontal impact is severe enough, the hood structure will continue its rearward movement and pass through the broken windshield into the passenger compartment to cause injury to the occupants of the passenger compartment.

Accordingly, it is an object of the present invention to provide a closure or hood structure arrangement in which additional hold-down means are provided to resist the upward and rearward movement of the hood structure upon frontal impact.

This is accomplished by providing a plurality of stud means, generally designated 16, anchored on the side edge means or flange 17 of the side fender aprons (see FIG. 2). Although, only a single stud means 16 is visible in FIG. 1, it will be understood that a plurality of such stud means 16 will be positioned along each longitudinally extending flange 17. Each stud means 16 comprises a shank 18 having a threaded portion 19 passing through a disc spring washer 21. The threaded portion 19 is threaded into a tapping plate 22 positioned in a retainer 23 on the underside of the flange 17.

The stud means shank 18 supports an enlarged head or cap 24. The headed end of each stud means 16 projects toward a hood structure contiguous side edge or marginal means 25 comprising a reinforcing plate 26 spaced beneath the outer panel 27 of the hood structure 14. The contiguous marginal means or reinforcing plate 26 is provided with a keyhole 28 comprising an elongated slot section 29 terminating in an enlarged circular aperture 31.

The width of each slot section 29 is sufficient to accommodate the shank 18 of a respective stud means 16 and the aperture 31 is of a size to permit the stud means cap or head 24 when in alignment therewith to pass freely therethrough as the closure is swung about its substantially horizontal hinge axis to and from a closed position.

If for any reason there is relative movement between the closure or hood structure 14 and the side fender aprons 12 of the vehicle front end 11, such as might occur if the front end of the vehicle impacts a barrier or another vehicle, the shank 18 of the stud means 16 is aligned so that it will move relatively to the keyhole 28 into the slot section 29 of the keyhole. This results in its cap or head 24 being moved into a position of alignment with the aperture 31 and in which it overlies marginal edges of the slot section 29 of the keyhole 28. In this relationship, the head or cap 24 holds the hood structure 14 against being sprung upwardly in opening direction and simultaneously minimizes the extent of longitudinal displacement of the hood structure 14 toward the passenger compartment.

To summarize, upon front end impact of the vehicle with a barrier or another object, the hood structure 14 is displaced rearwardly causing the "keyhole" to be engaged with the headed stud 16. The lock-up provided by this engagement results in a strong hold-down force being applied to the hood structure 14 during impact which prevents the hood structure from being displaced rearwardly and upwardly thereby protecting the integrity of the windshield 32.

It is to be understood that this invention is not limited to the exact construction illustrated and described above, but that various changes and modifications may be made without departing from the spirit and scope of the invention as defined by the appended claims.

We claim:

1. A vehicle compartment having side walls extending longitudinally of the vehicle and an elongated closure structure hinged at one end of the compartment for swinging movement only between closed and opened positions and a latch for said closure structure, the closure structure in closed position having side edge means in contiguous relationship to side edge means of the compartment side walls,
   a plurality of stud means each having a shank capped by an enlarged head portion,
   each stud means being anchored on one of the side edge means and having its capped end projecting toward the contiguous side edge means,
   the contiguous side edge means having elongated slot means extending longitudinally of the vehicle,
   each slot means having an elongated section terminating in enlarged aperture at one end,
   the width of each slot means section being sufficient to accommodate a stud means shank and the aperture being of a size permitting a stud means head portion to pass freely therethrough as the closure is swung to and from a closed position,
   the shank of each stud means being positioned to enter a slot means section and the head portion thereon to be displaced relative to the enlarged aperture into slot means margin engagement thereby minimizing upward and longitudinal displacement of the closure structure upon the latter being shifted longitudinally as the result of an endwise impact upon the closure structure at its hinged end.

2. A vehicle compartment according to claim 1, in which:
   the side edge means of the compartment side walls comprise horizontal flanges,
   each stud means is mounted on a flange with its capped ends in spaced relationship thereto.

3. A vehicle compartment according to claim 2, in which:
   the slot means are located in the side edge means of the closure structure,
   and the slot means are oriented to coact with the stud means to hold the closure in closed position upon displacement of the closure toward the passenger area of the vehicle.

4. A vehicle engine compartment structure having side walls extending longitudinally of the vehicle body and an elongated hood structure hinged at the front end of the compartment structure for swinging movement only about a substantially horizontal axis between closed and opened positions and a latch for said hood, the hood structure having at its side edges reinforcing members spaced from its outer panel,
   the compartment structure side walls have a longitudinally extending flange positioned beneath the marginal portions of the side edges of the inner panels,
   a plurality of studs each having an enlarged cap above its shank,
   the studs being mounted on each side wall flange rearwardly of the front end of the hood structure,
   each stud having its cap spaced from the surface of the respective flange,
   each reinforcing panel member having an elongated slot therein,
   the slot having an elongated section of a width to accommodate the shank of the stud and an aperture at its rear end through which the stud cap is free to pass as the hood structure moves normally about its hinged axis from closed to opened position with the stud cap in alignment with the slot aperture,
   the shank of each stud being positioned to enter the elongated section of the slot upon a front end impact causing the hood structure to be shoved rearwardly as the latch fails,
   and the cap on each stud accordingly being shiftable out of alignment with respect to slot aperture into abutting relationship to marginal edges of the slot to thereby hold the hood structure against being sprung upwardly in open direction and simultaneously minimizing the extent of longitudinal displacement toward the passenger compartment.

* * * * *